United States Patent
Yamaguchi

(10) Patent No.: US 9,304,627 B2
(45) Date of Patent: Apr. 5, 2016

(54) DISPLAY DEVICE AND DISPLAY CONTROL SYSTEM

(71) Applicant: Panasonic Intellectual Property Management Co., Ltd., Osaka (JP)

(72) Inventor: Hiroshi Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 7 days.

(21) Appl. No.: 14/540,984

(22) Filed: Nov. 13, 2014

(65) Prior Publication Data

US 2015/0070328 A1    Mar. 12, 2015

Related U.S. Application Data

(63) Continuation of application No. PCT/JP2013/004169, filed on Jul. 4, 2013.

(30) Foreign Application Priority Data

Jul. 27, 2012    (JP) ................................ 2012-166787

(51) Int. Cl.
*G06F 3/042*    (2006.01)
*G06F 3/0354*    (2013.01)
(Continued)

(52) U.S. Cl.
CPC .............. *G06F 3/042* (2013.01); *G02B 6/0051* (2013.01); *G02B 6/0053* (2013.01); *G06F 3/0321* (2013.01); *G06F 3/03542* (2013.01)

(58) Field of Classification Search
CPC ... G06F 3/042; G06F 3/03542; G06F 3/0321; G02B 6/0051; G02B 6/0053
See application file for complete search history.

(56) References Cited

U.S. PATENT DOCUMENTS

| | | | | |
|---|---|---|---|---|
| 7,880,970 B2 * | 2/2011 | Ohta | ...................... | G02B 5/045 359/622 |
| 7,990,490 B2 * | 8/2011 | Lee | ...................... | G02B 6/0053 349/62 |
| 8,184,235 B2 * | 5/2012 | Choi | ................... | G02B 5/0221 349/62 |

(Continued)

FOREIGN PATENT DOCUMENTS

| | | |
|---|---|---|
| JP | 2007-226577 A | 9/2007 |
| JP | 2009-043218 A | 2/2009 |
| JP | 2012-018880 A | 1/2012 |

OTHER PUBLICATIONS

International Search Report issued in PCT/JP2013/004169, dated Oct. 15, 2013, with English translation.

*Primary Examiner* — Andrew Sasinowski

(74) *Attorney, Agent, or Firm* — McDermott Will & Emery LLP

(57) ABSTRACT

The display device includes: a display panel; and a surface light source section. A transmittance of light transmitted from a front surface of a prism sheet of the surface light source section is lowest when an incident angle thereof is a determined angle. An angle distribution conversion sheet of the surface light source section has a conversion region that causes light incident on a front surface thereof at the determined incident angle to be emitted from a back surface thereof at an emission angle of not larger than 40° or not smaller than 60°, in a cross-sectional view in a direction perpendicular to an extension direction of prisms. When light is applied to the front surface of the angle distribution conversion sheet at the determined incident angle and in the direction in a front view, 20% or more of the light passes through the conversion region.

9 Claims, 11 Drawing Sheets

(51) Int. Cl.
*F21V 8/00* (2006.01)
*G06F 3/03* (2006.01)

(56) References Cited

U.S. PATENT DOCUMENTS

| | | | | |
|---|---|---|---|---|
| 8,251,562 B2* | 8/2012 | Kuramitsu | ............ | G02B 6/0021 349/65 |
| 8,279,377 B2* | 10/2012 | Usukura | ........... | G02F 1/133504 349/112 |
| 8,333,496 B2* | 12/2012 | Han | .................... | G02B 6/0025 362/561 |
| 2006/0055682 A1 | 3/2006 | Chen | | |
| 2010/0277669 A1* | 11/2010 | Adachi | ................. | G02B 6/0056 349/62 |
| 2011/0109592 A1* | 5/2011 | Kurokawa | ............. | G06F 3/0412 345/175 |
| 2011/0109641 A1 | 5/2011 | Yoshida | | |
| 2012/0320310 A1* | 12/2012 | Adachi | ................. | G02B 5/045 349/64 |

* cited by examiner

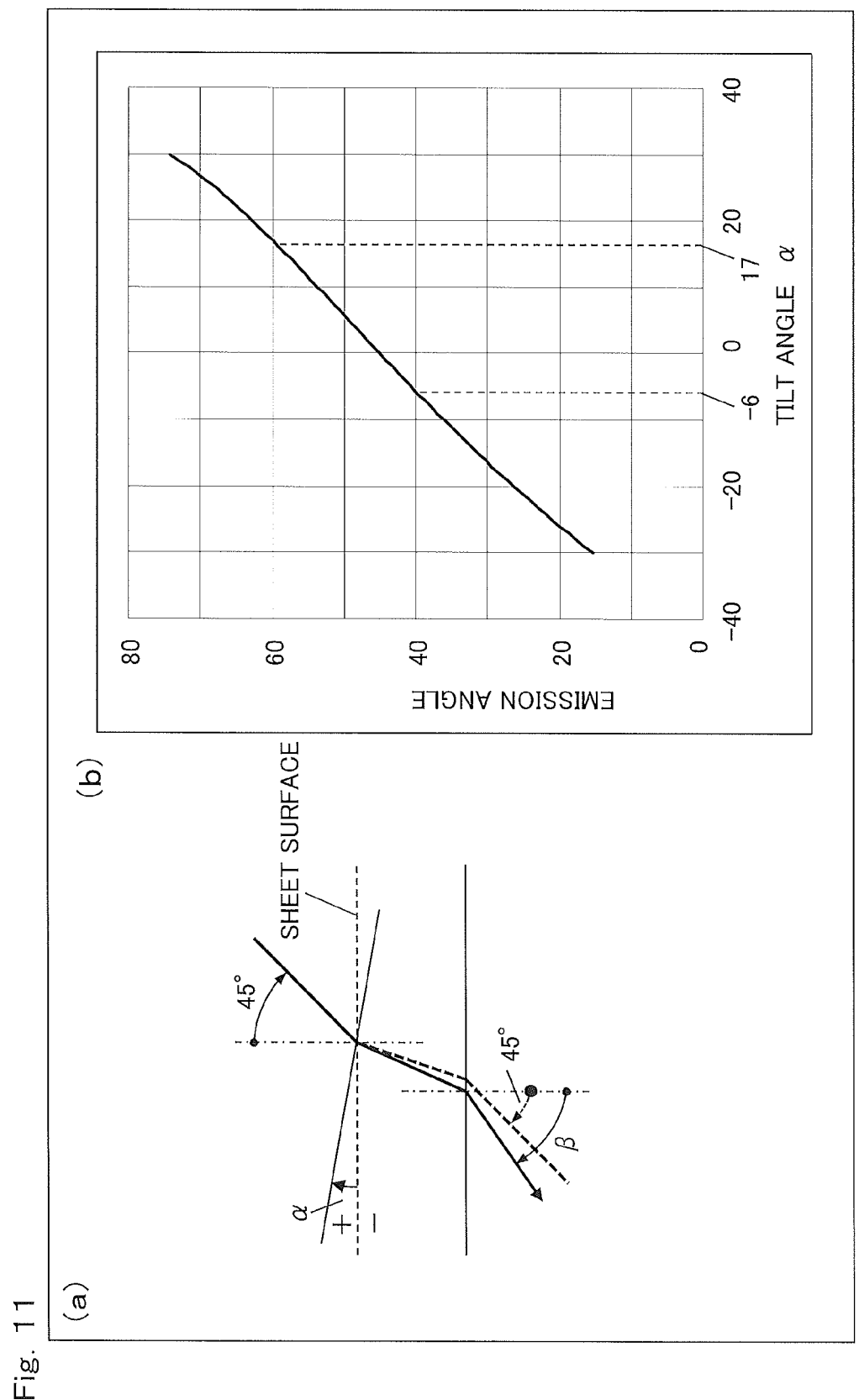

DISPLAY DEVICE AND DISPLAY CONTROL SYSTEM

RELATED APPLICATIONS

This application is a continuation of International Application No. PCT/JP2013/004169, filed on Jul. 4, 2013, which in turn claims the benefit of Japanese Application No. 2012-166787, filed on Jul. 27, 2012, the disclosures of which Applications are incorporated by reference herein.

BACKGROUND

1. Field

The present disclosure relates to a display device that enables a handwriting input on a display surface, and the like.

2. Description of the Related Art

A technology is known in which when characters or the like are written on paper with a pen, the information written on the paper is computerized and transmitted to a server or a terminal (see Japanese Laid-Open Patent Publication No. 2007-226577).

In addition, as a display device that enables a handwriting input on a display surface, a display device is known in which an input coordinate on a display surface is detected with an input pen or the like by a method such as a resistive pressure method or a capacitance method and information such as a character is displayed on the basis of the detected coordinate information.

In such a display device, a coordinate pointing range on the display surface and a display screen are associated with each other. When the input pen is moved on the display surface, information such as a character is displayed on the display screen in accordance with the movement.

SUMMARY

The present disclosure provides a display device having improved accuracy of reading a position information pattern.

A display device according to the present disclosure includes: a display panel having a display area on which an image is displayed; a backlight unit including a surface light source section arranged at a back surface side of the display panel and a diffuse reflection sheet arranged at a back surface side of the surface light source section; and a plurality of position information patterns arranged on the display area and each representing information regarding a position thereof on the display area. The surface light source section includes: at least one prism sheet configured to cause light emitted from the surface light source section to have directivity; and an angle distribution conversion sheet arranged between the prism sheet and the display panel. A transmittance of light transmitted from a front surface of the prism sheet to a back surface of the prism sheet is lowest when an incident angle thereof with respect to a sheet surface of the prism sheet is a determined angle of larger than 40° and smaller than 60°. The angle distribution conversion sheet has a conversion region that causes light incident on a front surface thereof at the determined angle as an incident angle with respect to a sheet surface of the angle distribution conversion sheet to be emitted from a back surface thereof at an emission angle of not larger than 40° or not smaller than 60° with respect to the sheet surface, in a cross-sectional view in a first direction perpendicular to an extension direction of prisms of the prism sheet. When light for reading the position information pattern is applied to the front surface of the angle distribution conversion sheet at the determined angle as an incident angle with respect to the sheet surface of the angle distribution conversion sheet and in the first direction in a front view of the angle distribution conversion sheet, 20% or more of the light passes through the conversion region.

A display device according to the present disclosure includes: a display panel having a display area on which an image is displayed; a backlight unit including a surface light source section arranged at a back surface side of the display panel and a diffuse reflection sheet arranged at a back surface side of the surface light source section; and a plurality of position information patterns arranged on the display area and each representing information regarding a position thereof on the display area. The surface light source section includes: at least one prism sheet configured to cause light emitted from the surface light source section to have directivity; and an angle distribution conversion sheet arranged between the prism sheet and the display panel. A transmittance of light transmitted from a front surface of the prism sheet to a back surface of the prism sheet is lowest when an incident angle thereof with respect to a sheet surface of the prism sheet is a determined angle. The angle distribution conversion sheet has a conversion region that causes light incident on a front surface thereof at the determined angle as an incident angle with respect to a sheet surface of the angle distribution conversion sheet to be emitted from a back surface thereof at an emission angle which allows a transmittance of the prism sheet for the light to be not smaller than 40°, in a cross-sectional view in a first direction perpendicular to an extension direction of a prism of the prism sheet. When light for reading the position information pattern is applied to the front surface of the angle distribution conversion sheet at the determined angle as an incident angle with respect to the sheet surface of the angle distribution conversion sheet in the first direction in a front view of the angle distribution conversion sheet, 20% or more of the light passes through the conversion region.

A display device according to the present disclosure includes: a display panel having a display area on which an image is displayed; a backlight unit including a surface light source section arranged at a back surface side of the display panel and a diffuse reflection sheet arranged at a back surface side of the surface light source section; and a plurality of position information patterns arranged on the display area and each representing information regarding a position on the display area. The surface light source section includes: at least one prism sheet configured to cause light emitted from the surface light source section to have directivity; and an angle distribution conversion sheet arranged between the prism sheet and the display panel. A plurality of projections or a plurality of recesses are formed as lens portions on a front surface or a back surface of the angle distribution conversion sheet so as to be arranged in a matrix manner. When a curvature radius of each lens portion is defined as r and a pitch between each lens portion in a direction in which the plurality of lens portions are arranged is defined as P, the plurality of lens portions are arranged so as to meet a relational expression of $1.5 \leq P/r \leq 3.0$.

According to the present disclosure, it is possible to provide a display device having improved accuracy of reading a position information pattern.

BRIEF DESCRIPTION OF THE DRAWINGS

FIG. 11 is a diagram for explaining angle conversion of light incident on a front surface of the angle distribution conversion sheet at an incident angle of 45° with respect to a sheet surface.

DETAILED DESCRIPTION

Hereinafter, an embodiment will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventor provides the following description and the accompanying drawings in order to allow a person of ordinary skill in the art to sufficiently understand the present disclosure, and the description and the drawings are not intended to restrict the subject matter of the scope of the patent claims.

Hereinafter, in the present embodiment, a system in which a liquid crystal display device is used will be described as an example of a display control system 10 (an information display device) according to the present disclosure. However, another type of a display device such as an organic EL display device may be used for the display control system 10.

[1. Regarding Entire Configuration of Display Control System Etc.]

Figure 1:
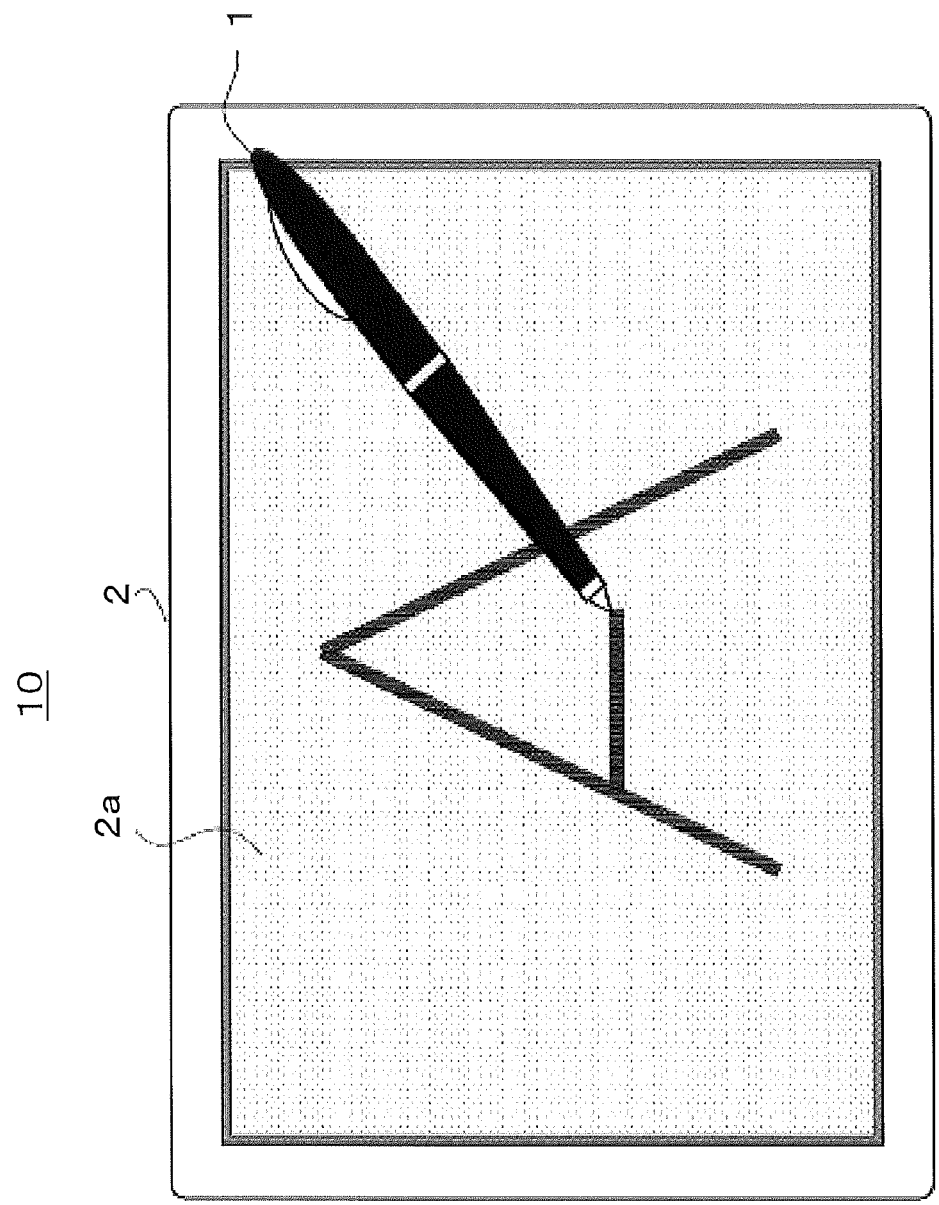
FIG. 1 is a configuration diagram of showing a usage situation of a display control system according to one embodiment of the present disclosure.

FIG. 1 is a diagram showing a usage situation of the display control system 10 (the information display device) according to the embodiment of the present disclosure. As shown in FIG. 1, the display control system 10 includes an optical electronic pen 1 as a position pointing device capable of performing a handwriting input and a display device 2 that receives information regarding a position pointed to by the electronic pen 1. The display device 2 includes a display panel 50 that displays a pen input image such as a character or a figure on a display surface 2a. It should be noted that although not shown in FIG. 1, a plurality of position information patterns 3 each of which is optically readable by the electronic pen 1 are arranged on a display area of the display panel 50 of the display device 2. Each position information pattern 3 has a plurality of dot-like marks 31.

In other words, in the display control system 10 according to the present disclosure, the position information patterns 3 each representing a position coordinate thereof on the display surface 2a are arranged on the display surface 2a of the display device 2. By the electronic pen 1 reading a position information pattern 3 as an optical image pattern, it is possible to identify a position coordinate (position information) at which the user performs a handwriting input on the display surface 2a. The electronic pen 1 reads a position information pattern 3 as an optical image pattern by applying detection light to the position information pattern 3. By so doing, when the tip of the electronic pen 1 is moved on the display surface 2a, it is possible to detect the trajectory of the tip of the electronic pen 1 (i.e., handwriting of a character or the like of which a handwriting input is performed by the user) from position information patterns 3 read continuously by the electronic pen 1.

In the display control system 10, position information that is information regarding a position pointed to by the electronic pen 1 and is identified by the electronic pen 1 is transmitted from the electronic pen 1 to the display device 2. On the basis of the position information received from the electronic pen 1, the display device 2 performs an operation of changing display information on the display surface 2a such that a pen input image is displayed on the display surface 2a. Therefore, the user is allowed to write a character, a figure, or the like on the display surface 2a of the display device 2 with the electronic pen 1 as if handwriting a character or the like on paper with a pen. In addition, it is also possible to use the electronic pen 1 like an eraser. In this case as well, similarly to the case where a character, a figure, or the like is written, the position of the tip of the electronic pen 1 is identified by the electronic pen 1 reading a position information pattern 3. Then, on the basis of the identified position information, the display device 2 performs an operation of deleting display information displayed on the display surface 2a. By so doing, it is possible to realize deletion of display information with the electronic pen 1.

Figure 2:
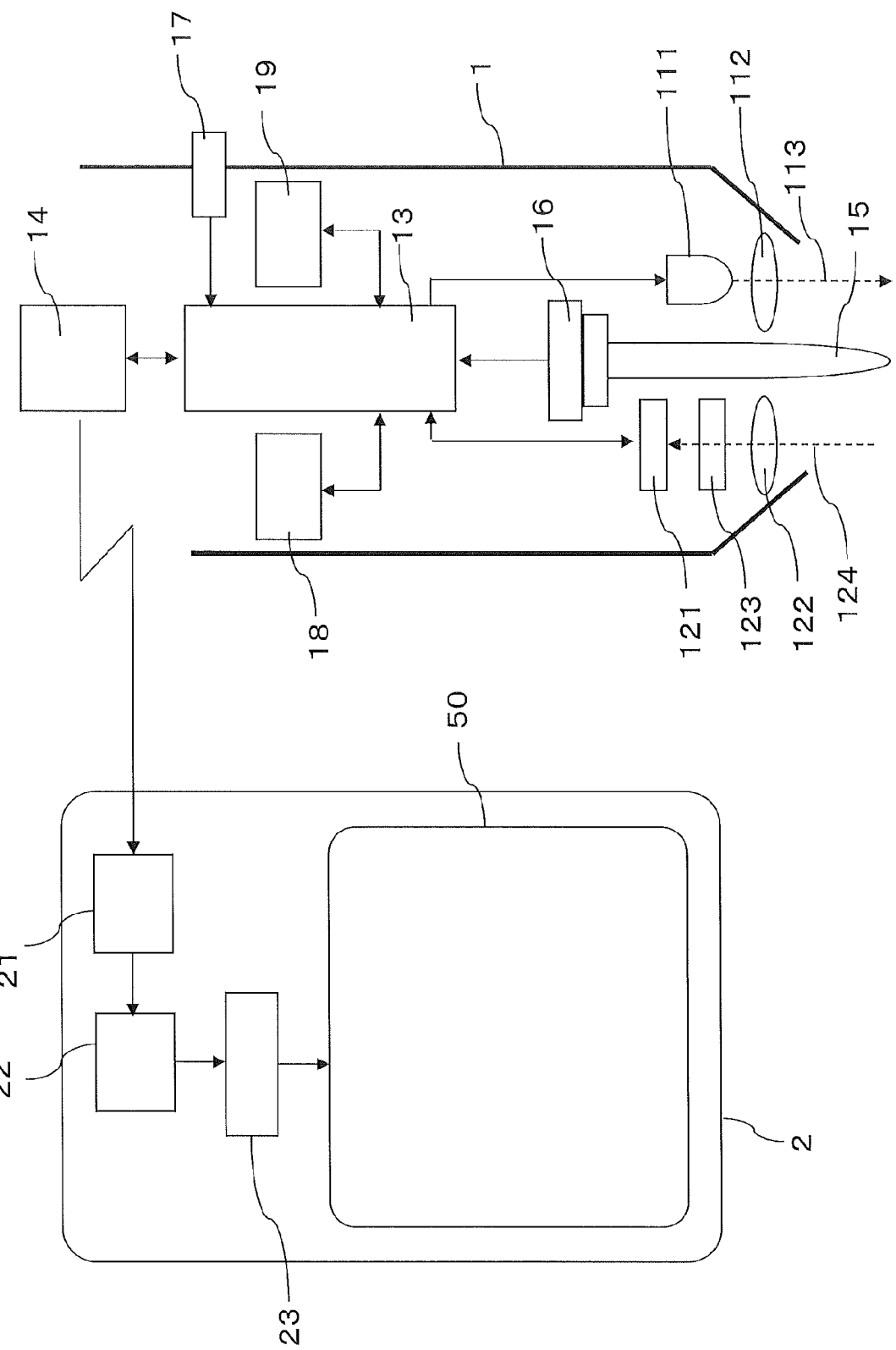
FIG. 2 is a schematic diagram showing the configuration of an electronic pen and the configuration of a display device in the display control system according to the embodiment of the present disclosure.

FIG. 2 is a schematic diagram showing the configuration of the electronic pen 1 and the configuration of the display device 2 in the display control system 10 according to the embodiment of the present disclosure.

As shown in FIG. 2, the electronic pen 1 includes an LED 111 that constitutes an infrared light irradiation section for emitting infrared light to the display device 2, a condenser lens 112 that condenses the light emitted from the LED 111, an image reading section 121 composed of an image sensor (CCD) that receives infrared light reflected on the display device 2 and captures an image of an position information pattern, a condenser lens 122 that causes the infrared light, reflected on the display device 2, to form an image on an imaging surface of the image reading section 121, and an infrared filter (IR filter) 123 that cuts visible light having passed through the condenser lens 122. Infrared light 113 emitted from the LED 111 of the electronic pen 1 is condensed by the condenser lens 112 and applied to the display surface 2a of the display device 2 that is pointed to by the tip of the electronic pen 1. The infrared light applied to the display surface 2a passes through the display panel 50 and is diffusely reflected on a later-described diffuse reflection sheet 48. Regardless of the inclination of the electronic pen 1, part of the infrared light is reflected on the diffuse reflection sheet 48 toward the electronic pen 1 side. Then, infrared light 124 that is reflected on the diffuse reflection sheet 48 and outputted from the display device 2 is condensed by the condenser lens 122, passes through the infrared filter (IR filter) 123, which cuts visible light, and is incident on the image reading section 121. Here, each mark 31 is formed from a material that absorbs infrared light (a material having a low transmittance for infrared light). Thus, almost no infrared light returns from each mark 31 to the electronic pen 1. On the other hand, a more amount of infrared light returns from a region between each mark 31 than from the region of each mark 31. As a result, an optical image in which the position information pattern 3 is represented in black is captured by the image reading section 121.

In other words, infrared light in a reading area having a determined range, of the display surface 2a of the display device 2, is condensed by the condenser lens 122 on the imaging surface (light receiving surface) of the image reading section 121, and an image of the position information pattern 3 included in the reading area is read by the image reading section 121. Information of the image read by the image reading section 121 is transmitted to a processing circuit section 13. The processing circuit section 13 recognizes an image of the dot-like marks 31 included in the position information pattern 3, processes data of the recognized image of the marks 31, and detects, as position information, a coordinate of a position pointed to by the tip of the electronic pen 1. In addition, the processing circuit section 13 converts the detected position information to a data signal and transmits the data signal to a transmission section 14. The transmission section 14 transmits the data of the position information (position coordinate) to a reception section 21 of the display device 2 via wireless communication.

In the display device 2, the data of the position information received by the reception section 21 is processed by a processing circuit section 22, a panel driving circuit section 23 is controlled on the basis of the processed data, and a display operation of a display panel 50 is controlled. By so doing, a character, a figure, or the like is displayed on the display surface 2a of the display panel 50 on the basis of the position coordinate identified by the electronic pen 1.

The series of operations described above is performed when a pen tip portion 15 arranged at the tip of the electronic pen 1 is in contact with the display surface 2a. Specifically, the pen tip portion 15 is arranged at the tip of the electronic pen 1, and a pressure sensor 16 that senses a writing pressure of the pen tip portion 15 is arranged within the electronic pen 1. When the pen tip portion 15 comes into contact with the display surface 2a of the display device 2, information of a pressure sensed by the pressure sensor 16 is transmitted from the pressure sensor 16 to the processing circuit section 13. In response to the signal transmitted from the pressure sensor 16, the processing circuit section 13 performs processing (a reading operation) on reading output of the image reading section 121.

It should be noted that the present disclosure is not limited to the configuration in which a reading operation is performed when the tip of the electronic pen 1 is in contact with the display surface 2a, and, for example, a switch 17 used in order that the user inputs a reading instruction may be provided in the electronic pen 1. In such a case, in response to the switch 17 being pressed, the processing circuit section 13 performs a reading operation. Thus, even when the electronic pen 1 is separated from the display surface 2a, it is possible to perform a reading operation.

In addition, the position coordinate of the pen tip (pen tip coordinate) identified by the electronic pen 1 is changed in accordance with the inclination of the electronic pen 1. Thus, an angle sensor 18 for detecting the inclination of the electronic pen 1 is provided within the electronic pen 1. For example, when the electronic pen 1 is vertically directed, the pen tip coordinate is directly below the electronic pen 1. When the electronic pen 1 is greatly inclined, the pen tip coordinate is at a position greatly away from the position directly below the electronic pen 1. The inclination of the electronic pen 1 is measured with the angle sensor 18, and inclination data of the electronic pen 1 is transmitted to the processing circuit section 13, and the processing circuit section 13 corrects the position information that is identified from the position information pattern 3 obtained by the image reading section 121, on the basis of the inclination data of the electronic pen 1. By so doing, it is possible to obtain accurate position information without being influenced by the inclination of the electronic pen 1.

In addition, an acceleration sensor 19 for detecting a moving speed (including acceleration) of the electronic pen 1 is provided within the electronic pen 1. The acceleration sensor 19 transmits data of a detected moving direction of and data of detected acceleration of the electronic pen 1 to the processing circuit section 13. Then, it is possible to obtain a moving amount, a moving direction, and the like of the electronic pen 1 by calculation of the processing circuit section 13 from the moving direction data and the acceleration data of the electronic pen 1.

[2. Regarding Position Information Patterns]

Figure 3:
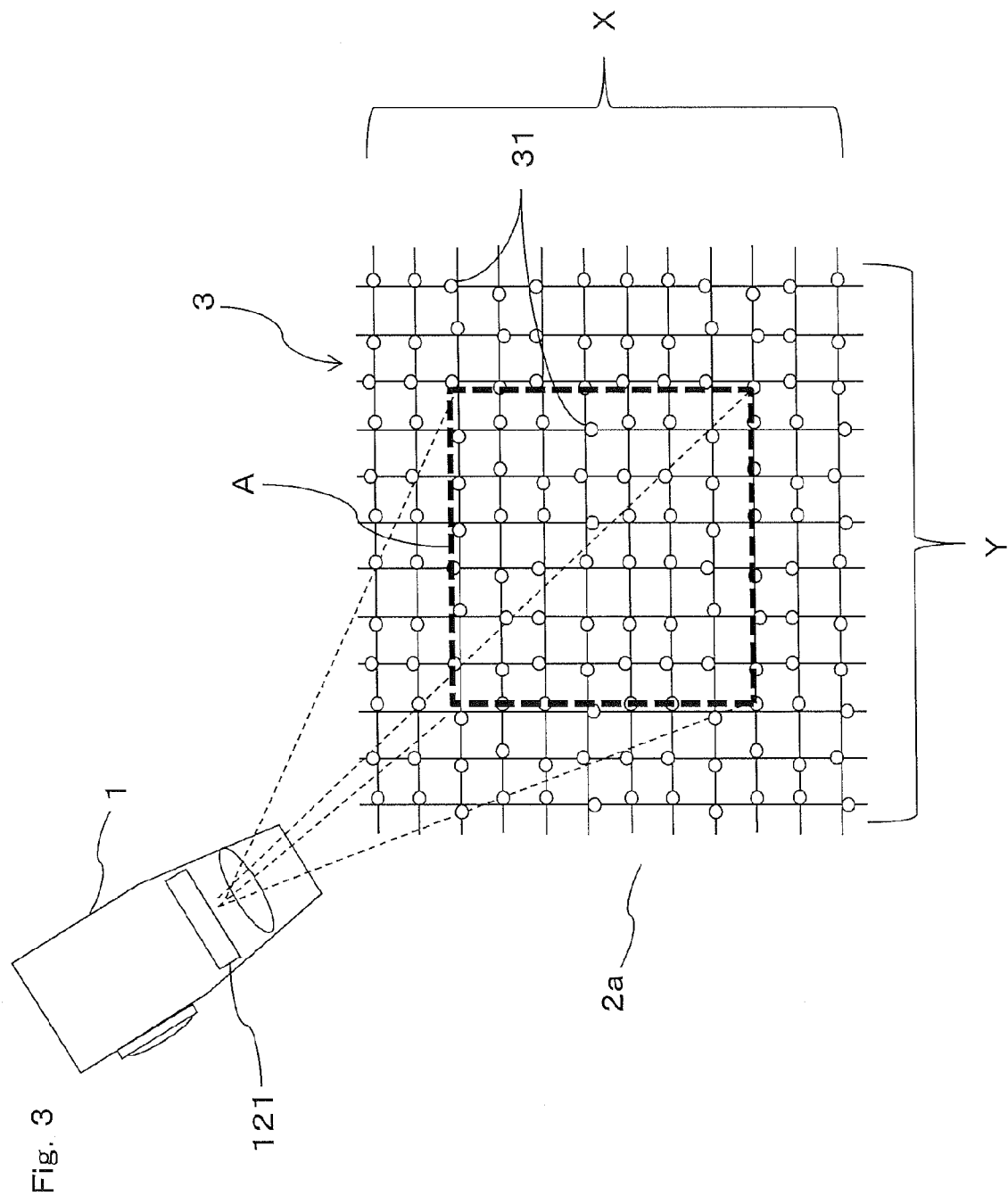
FIG. 3 is an explanatory diagram showing an example of a position information pattern arranged on a display surface of the display device.
Figure 4:
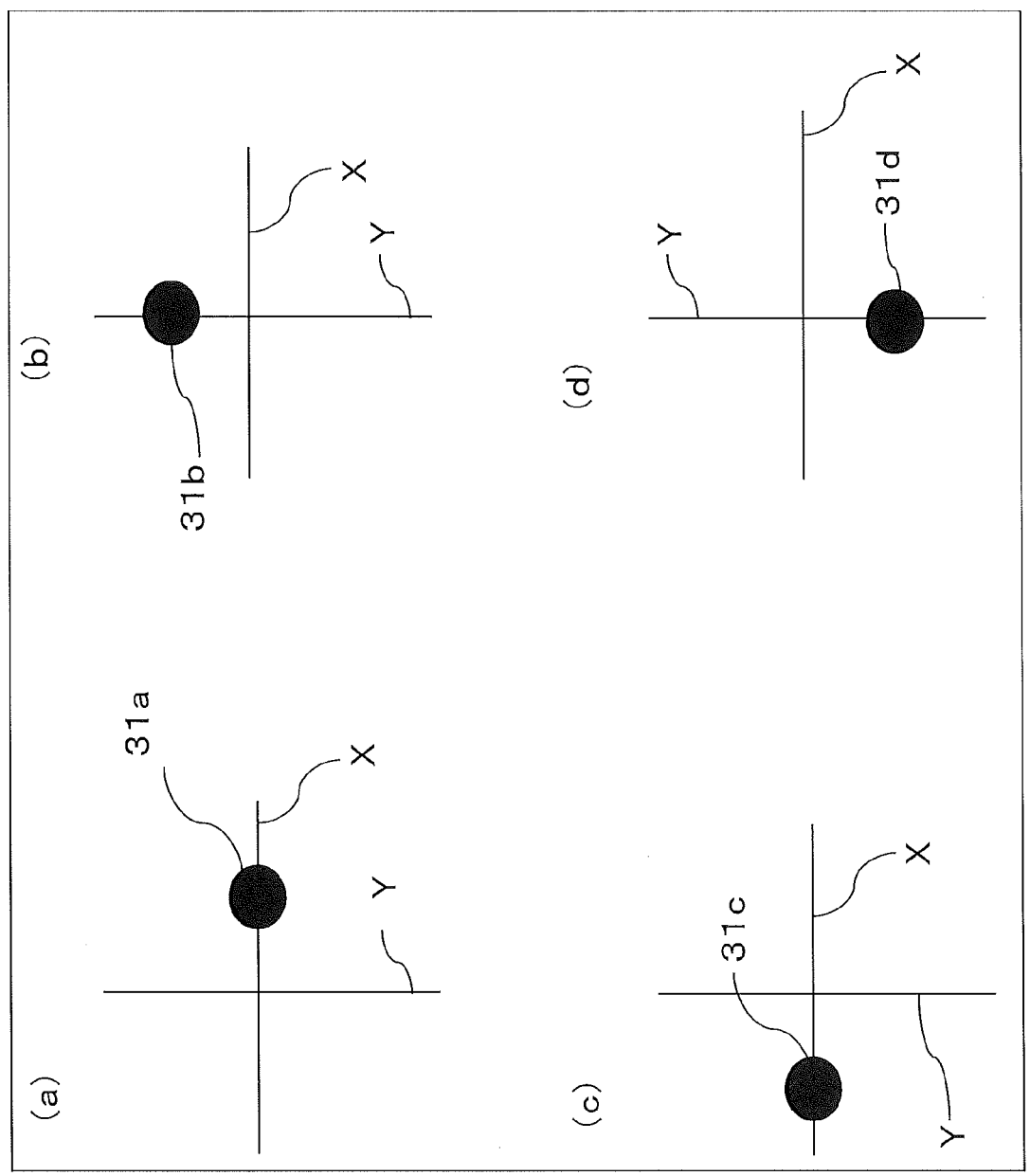
FIG. 4 is an explanatory diagram for explaining an example of a method for obtaining a position coordinate from a position information pattern.

FIGS. 3 and 4 are explanatory diagrams for explaining an example of the position information patterns 3 arranged on the display surface 2a of the display device 2 and an example of a method for obtaining a position coordinate from the position information pattern 3.

As shown in FIG. 3, a plurality of marks 31 are arranged on the display area including the display surface 2a of the display device 2 in a specific array pattern. On the display area, the position information patterns 3 are formed of the plurality of marks 31. Specifically, when a pixel area of m dots×n dots (e.g., 6 dots×6 dots) within the display surface 2a is set as a unit area A, a position information pattern 31 is formed of a plurality of marks 31 within the unit area A. By the electronic pen 1 reading the marks 31 formed in the position information pattern 3 within the unit area A, the position coordinate pointed to by the tip of the electronic pen 1 is identified.

FIGS. 4(a) to 4(d) are explanatory diagrams for explaining an example of arrangement patterns of each mark 31 in each position information pattern 3 and a method for position coordinate transformation. In this example, as shown in FIGS. 4(a) to 4(d), each mark 31 is arranged near the intersection of a virtual reference line X and a virtual reference line Y. In FIG. 3, a grid is formed of a plurality of reference lines X and a plurality of reference lines Y. Each of marks 31a to 31d is arranged at a position shifted from the intersection (grid point) of the reference line X and the reference line Y toward the right side (FIG. 4(a)), the upper side (FIG. 4(b)), the left side (FIG. 4(c)), or the lower side (FIG. 4(d)). For example, characters "1", "2", "3", and "4" are assigned to the marks 31a, 31b, 31c, and 31d, respectively. Each character is for representing a position coordinate of a unit area read by the electronic pen 1. In other words, the position coordinate of the unit area is represented by a plurality of characters obtained by converting a plurality of marks 31 within the unit area. As shown in FIG. 3, by the electronic pen 1 reading the marks 31 formed in the position information pattern 3 within the unit area A, it is possible to identify the position coordinate of the read unit area A.

In other words, for example, each of the 36 marks 31 within the unit area A of 6 dots×6 dots is arranged in the position information pattern 3 in any one of the four kinds of arrangement patterns shown in FIGS. 4(a) to 4(d). With regard to the 36 marks 31, by combining the four kinds of arrangement patterns in accordance with a position within the display surface 2a, it is possible to form a position information pattern 3 representing a coordinate of the position thereof.

Here, each mark 31 in each position information pattern 3 is formed from a material that transmits visible light. For example, each mark 31 is formed from a material having a transmittance of 90% or higher for visible light. Thus, it is possible to reduce influence of each mark 31 on a display image, in the visible light range, which is displayed on the display surface 2a of the display device 2. In addition, each mark 31 is formed from a material that absorbs infrared light (a material having a low transmittance for infrared light) as described above. For example, each mark 31 is formed from a material having a transmittance of 50% or lower (e.g., 20% or lower) for infrared light.

It should be noted that each mark 31 may be formed from a material having light-scattering properties or diffraction grating properties such that the direction of incident light is changed when infrared light is applied thereto. In such a case, since each mark 31 has light-scattering properties or diffraction properties, light incident on each mark 31 is reflected (scattered, diffused, diffracted, changed in phase, or bent) on each mark 31 and outputted to the outside of the display device 2. It is possible to detect each mark 31 by the reflected light.

For example, when each mark 31 is formed from a material that diffusely reflects infrared light, infrared light incident on each mark 31 from the outside of the display device 2 is diffusely reflected on each mark 31, and thus part thereof surely returns to the electronic pen 1 side. On the other hand, the region between each mark 31 specularly reflects infrared light. From the region between each mark 31, almost no infrared light returns to the electronic pen 1 side. Thus, an optical image in which the marks 31 are represented in white is captured by the image reading section 121.

[3. Regarding Display Panel]

Next, an example of the configuration of the display panel 50 of the display device 2 will be described.

Figure 5:
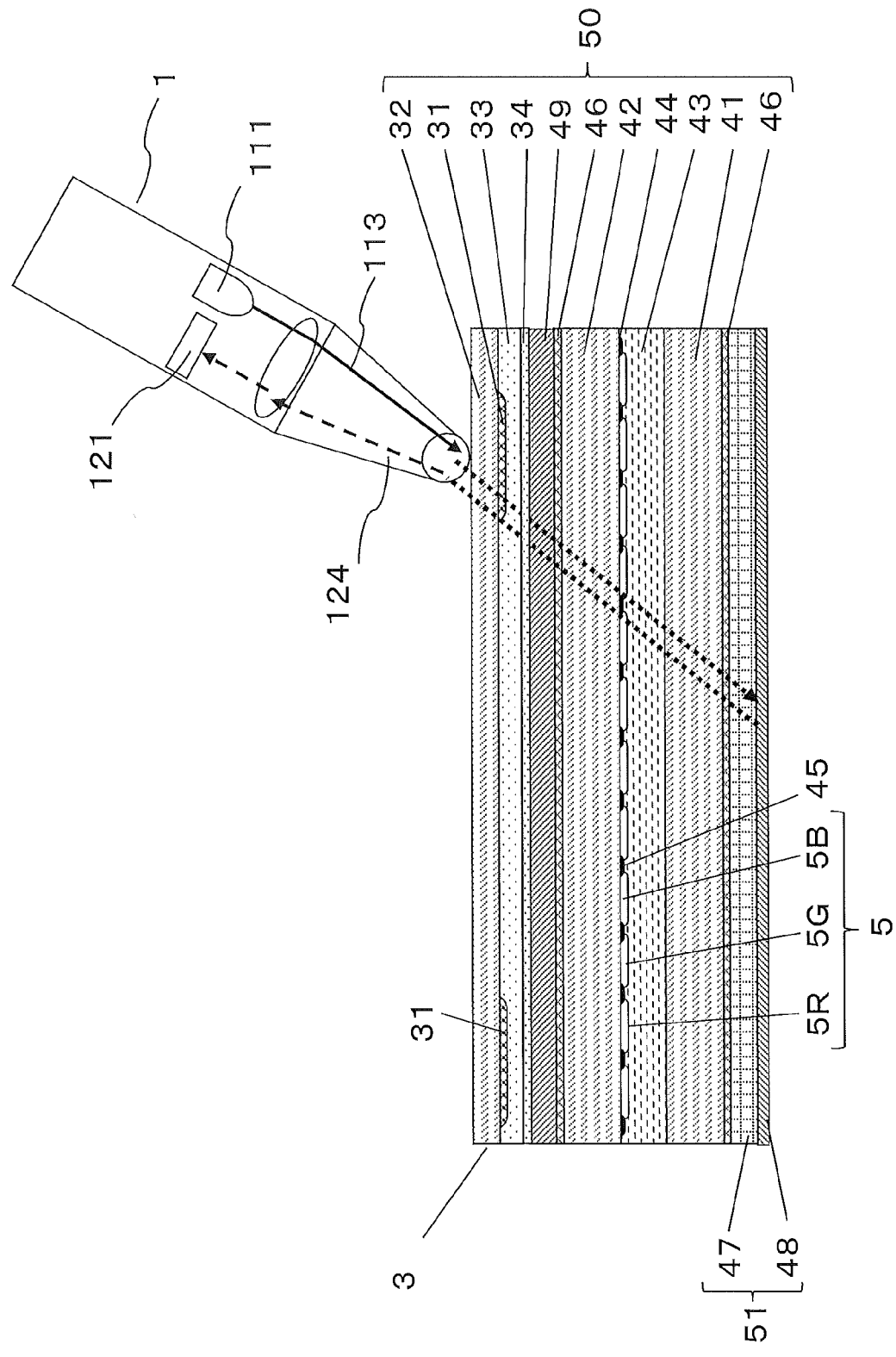
FIG. 5 is a schematic configuration diagram of a display panel in which position information patterns are arranged.

FIG. 5 is a schematic configuration diagram showing the configuration of the display panel 50 in which the position information patterns 3 are arranged. The display panel 50 shown in FIG. 5 is an example of an active matrix type TFT color liquid crystal display panel.

In FIG. 5, a liquid crystal panel section 50 (a display panel) is formed by enclosing a liquid crystal member 43 between two substrates 41 and 42 opposed to each other. Each of the substrates 41 and 42 is a plate having optical transparency, and, for example, a glass substrate may be used. It should be noted that although not shown, thin film transistors, which are crystal liquid driving components, a first transparent electrode, a signal electrode, and a scanning electrode are formed on the substrate 41 at the back side (the lower side in FIG. 5) in the liquid crystal panel section 50. In addition, pixels 5 each composed of at least a red sub-pixel 5R, a green sub-pixel 5G, and a blue sub-pixel 5B, a black matrix 45 that separates the pixels 5 and the sub-pixels 5R, 5G, and 5B, and a second transparent electrode are formed on the back side of the substrate 42 at the front side (the upper side in FIG. 5). The black matrix 45 is a light shielding member that has openings corresponding to the sub-pixels 5R, 5G, and 5B, is composed of a metal thin film of chromium or the like, and shields the boundary portions between the sub-pixels 5R, 5G, and 5B from light. The pixels 5 and the black matrix 45 are formed on a color filter 44. The enclosed liquid crystal member 43 is arranged between the transparent electrodes formed on the two substrates 41 and 42. In addition, polarizing plates 46 are arranged on outer surfaces of the substrates 41 and 42, respectively. The polarizing plates 46 are attached to the substrates 41 and 42, respectively.

It should be noted that the color filter 44 is not limited to the RGB color filter. Sub-pixels of cyan (C), magenda (M), yellow (Y), or the like may be formed on the color filter 44, or sub-pixels of white (W) may be formed on the color filter 44.

A backlight unit 51 is arranged on the lower side of the polarizing plate 46 at the back side (i.e., the lower side in FIG. 5) of the liquid crystal panel section 50. The backlight unit 51 includes a surface light source section 47 and the diffuse reflection sheet 48. In addition, an on-cell type capacitance touch panel 49 is arranged on the upper side of the polarizing plate 46 at the display surface side (i.e., the upper side in FIG. 5) of the liquid crystal panel section 50. It should be noted that the touch panel 49 may be an in-cell type touch panel, or another type of touch panel such as a resistive pressure-sensitive type. Alternatively, the touch panel 49 may be omitted from the liquid crystal panel section 50.

The liquid crystal panel section 50 has a configuration in which a plurality of the pixels 5 each composed of a plurality of the sub-pixels 5R, 5G, and 5B whose colors are different from each other are arranged in a matrix manner. The liquid crystal panel section 50 controls ON/OFF of each of thin film transistors for the sub-pixels 5R, 5G, and 5B constituting each pixel 5 and selectively controls the polarization of the liquid crystal member 43, whereby it is possible to perform a color display of a character or an image.

In addition, a plurality of the position information patterns 3 from each of which position information is read by the electronic pen 1 are arranged on the touch panel 49 of the liquid crystal panel section 50. Each position information pattern 3 has a plurality of marks 31. The position information pattern 3 is configured by forming a plurality of marks 31 having a circular shape, a quadrate shape, or the like in a determined array pattern on a translucent base film 32 made of resin, and forming a translucent resin layer 33 on the base film 32 such that the resin layer 33 covers the plurality of marks 31, as shown in FIG. 5. The resin layer 33 is a layer for adjusting a refractive index, and its refractive index is slightly different from that of each mark 31. In addition, an adhesive layer 34 made of a translucent adhesive material is provided on the resin layer 33. The resin layer 33 is attached on the touch panel 49 of the liquid crystal panel section 50 by the adhesive layer 34 such that the base film 32 is on the front side of the liquid crystal panel section 50.

Each mark 31 in each position information pattern 3 is formed from a material that transmits visible light and absorbs infrared light. Thus, it is possible to reduce influence of each mark 31 on a color display image, in the visible light range, which is displayed on the liquid crystal panel section 50.

As shown in FIG. 5, first, the infrared light 113 emitted from the electronic pen 1 is applied to the position information pattern 3. Then, as described above, the infrared light 113 is diffusely reflected on the diffuse reflection sheet 48, and part of the infrared light 113 is reflected toward the electronic pen 1 side. Then, the infrared light 124 reflected toward the electronic pen 1 side passes through a region where the position information pattern 3 is formed. At that time, in the position information pattern 3, the infrared light 124 is absorbed in a region where each mark 31 is arranged, and the infrared light 124 is transmitted in a region where no mark 31 is arranged. Thus, the infrared light 124 incident on the electronic pen 1 is received by the image reading section 121 and the position information pattern 3 is read therefrom, whereby it is possible to detect position information (coordinate information) represented by the marks 31 formed in the position information pattern 3.

[4. Regarding Backlight Unit]

Next, the backlight unit 51 disposed at the back surface side of the display panel 50 according to the present disclosure will be described.

Figure 6:
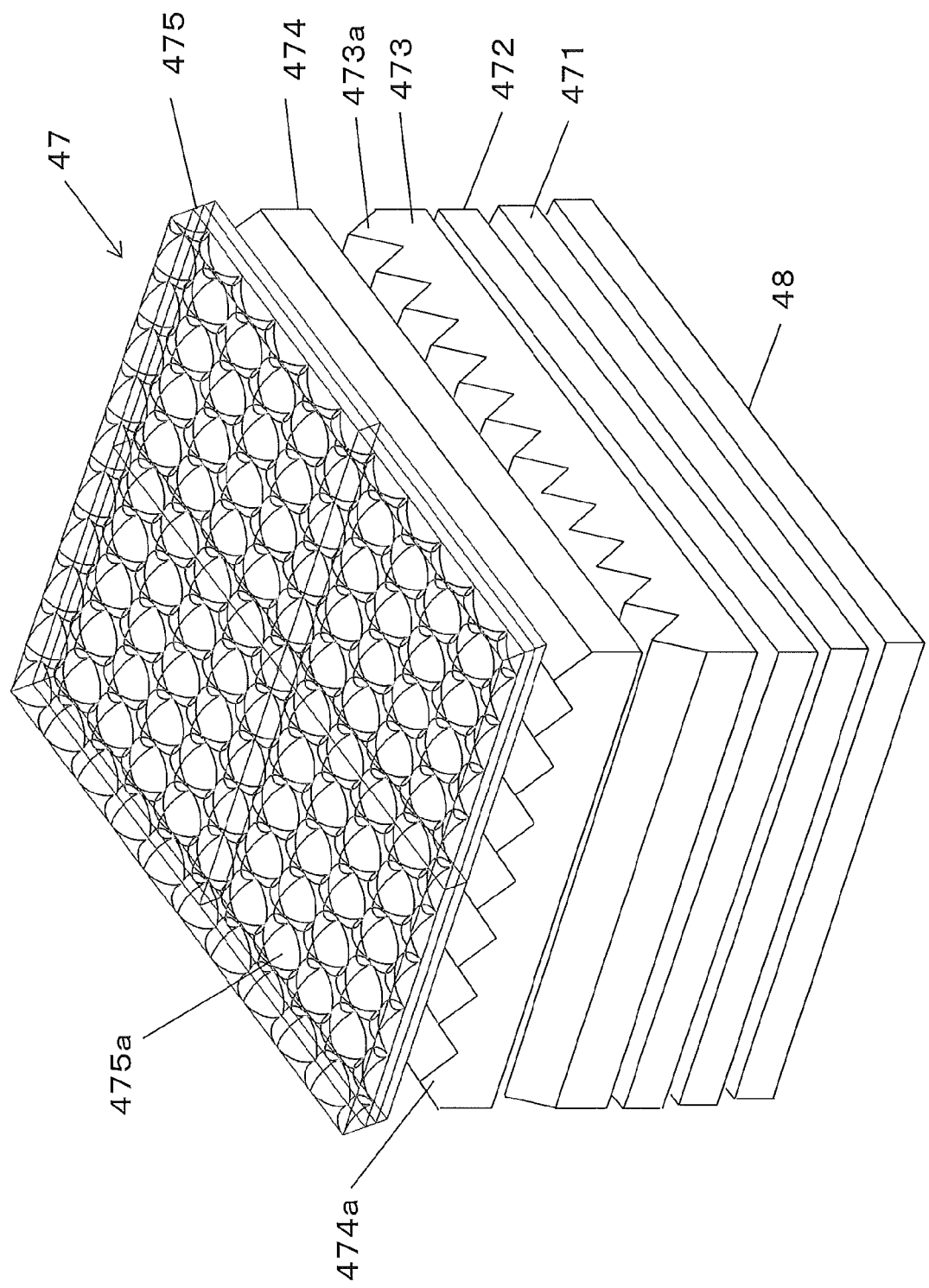
FIG. 6 is a schematic perspective view showing main components of a surface light source section in a backlight unit shown in FIG. 5.

FIG. 6 is a schematic perspective view showing the arrangement and the structure of main components of the surface light source section 47 (a surface light source member) shown in FIG. 5. It should be noted that in the present embodiment, an edge light type is used as the backlight unit 51, but the backlight unit 51 is not limited thereto.

As shown in FIG. 6, the surface light source section 47 includes a light guide plate 471, a diffusion sheet 472, a first prism sheet 473, a second prism sheet 474, and an angle distribution conversion sheet 475. In the surface light source section 47, the light guide plate 471, the diffusion sheet 472, the first prism sheet 473, the second prism sheet 474, and the angle distribution conversion sheet 475 are arranged parallel to each other in this order from the back surface side.

The light guide plate 471 is formed in a substantially rectangular plate shape. Light from a point light source (or line light source) such as a light emitting diode (LED) is incident on a side surface of the light guide plate 471. The light guide plate 471 converts the light incident on the side surface of the light guide plate 471 and introduced into the light guide plate 471, to planar light and emits the planar light through a front surface of the light guide plate 471. The diffusion sheet 472 diffuses light emitted from the front surface of the light guide plate 471, thereby causing the illuminance of light emitted by the surface light source section 47 to be uniform over the entire surface thereof. The first prism sheet 473 and the second prism sheet 474 cause light emitted from a front surface of the diffusion sheet 472 to have directivity, thereby improving the brightness of the light emitted by the surface light source section 47. One of the first prism sheet 473 and the second prism sheet 474 is a horizontal convergence sheet, and the other of the first prism sheet 473 and the second prism sheet 474 is a vertical convergence sheet. Each of the first prism sheet 473 and the second prism sheet 474 is a rectangular sheet. A plurality of prisms 473a or 474a are formed on the entirety of a front surface of each of the first prism sheet 473 and the second prism sheet 474 so as to extend straight in an extension direction parallel to one side of the front surface. The plurality of prisms 473a or 474a are formed continuously at regular pitches in a direction perpendicular to the extension direction thereof. A back surface of each of the first prism sheet 473 and the second prism sheet 474 is a flat surface. In a plan view, the extension direction of each prism 473a of the first prism sheet 473 and the extension direction of each prism 474a of the second prism sheet 474 are perpendicular to each other. The angle distribution conversion sheet 475 is arranged between the second prism sheet 474 and the display panel 50. The angle distribution conversion sheet 475 changes the angle distribution of light incident on a front surface thereof at the display panel 50 side to another angle distribution, and emits the light from a back surface thereof at the prism sheets 473 and 474 side. The angle distribution conversion sheet 475 will be described in detail later.

Figure 7:
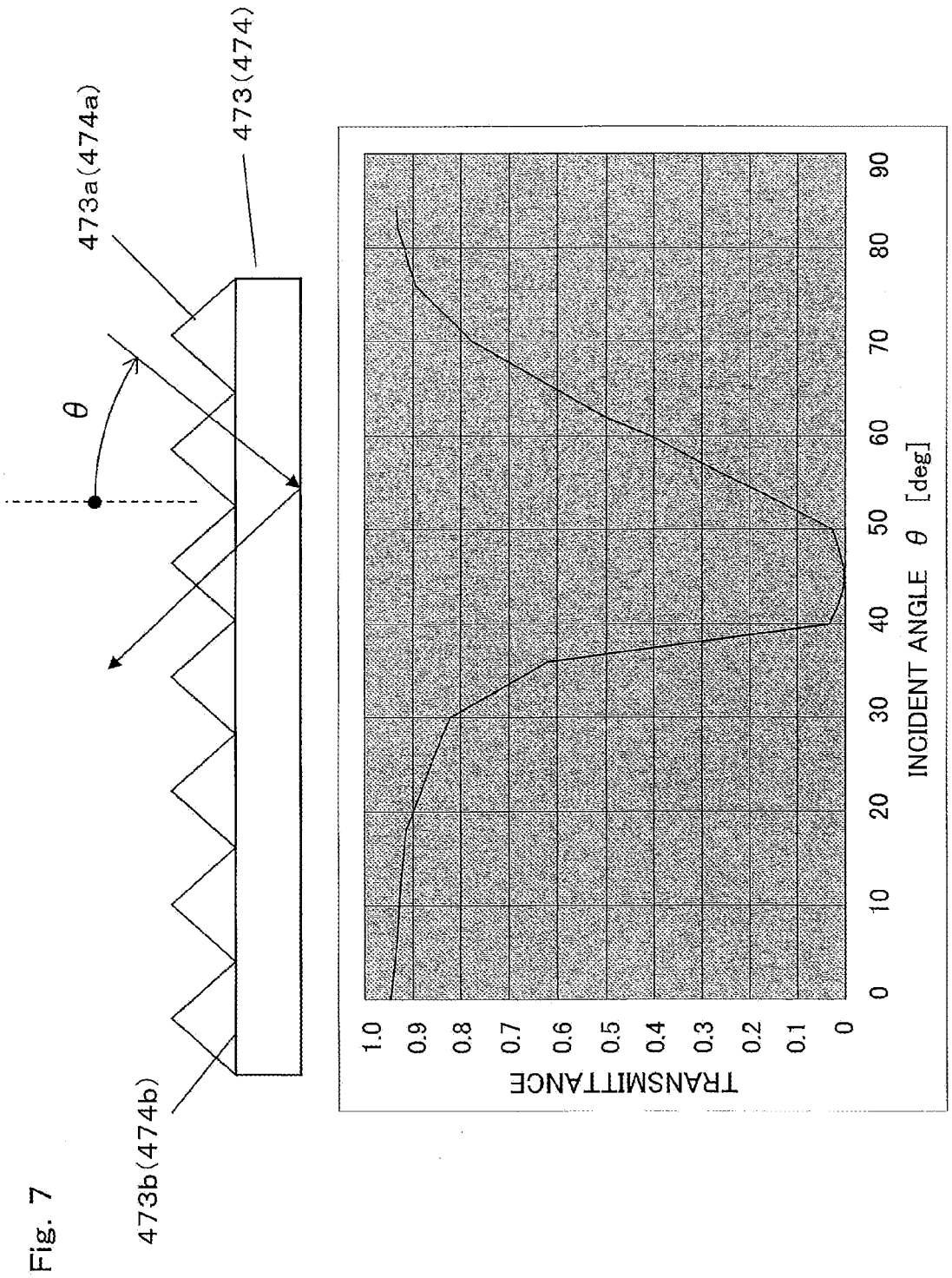
FIG. 7 is a diagram for explaining an optical characteristic of a prism sheet, showing a transmittance of light incident on a front surface of the prism sheet at an incident angle θ for the prism sheet.

FIG. 7 is a diagram for explaining an optical characteristic of each of the horizontal convergence and vertical convergence prism sheets 473 and 474, showing a transmittance of light incident on the front surface at the prism 473a or 474a side at an incident angle θ for the prism sheet 473 or 474. FIG. 7 represents the optical characteristic in a cross-sectional view in a direction perpendicular to the extension direction of the prisms 473a or 474a. The incident angle θ represents an incident angle with respect to a sheet surface 473b or 474b of the prism sheet 473 or 474. The transmittance of light transmitted from the front surface of the prism sheet 473 or 474 to the back surface thereof becomes the lowest when the incident angle θ with respect to the sheet surface of the prism sheet 473 or 474 is a determined angle θa of larger than 40° and smaller than 60° (θa=45° in the case of FIG. 7). It should be noted that in the present embodiment, the first prism sheet 473 and the second prism sheet 474 have the same optical characteristic, but the present disclosure is not limited thereto.

Figure 8:
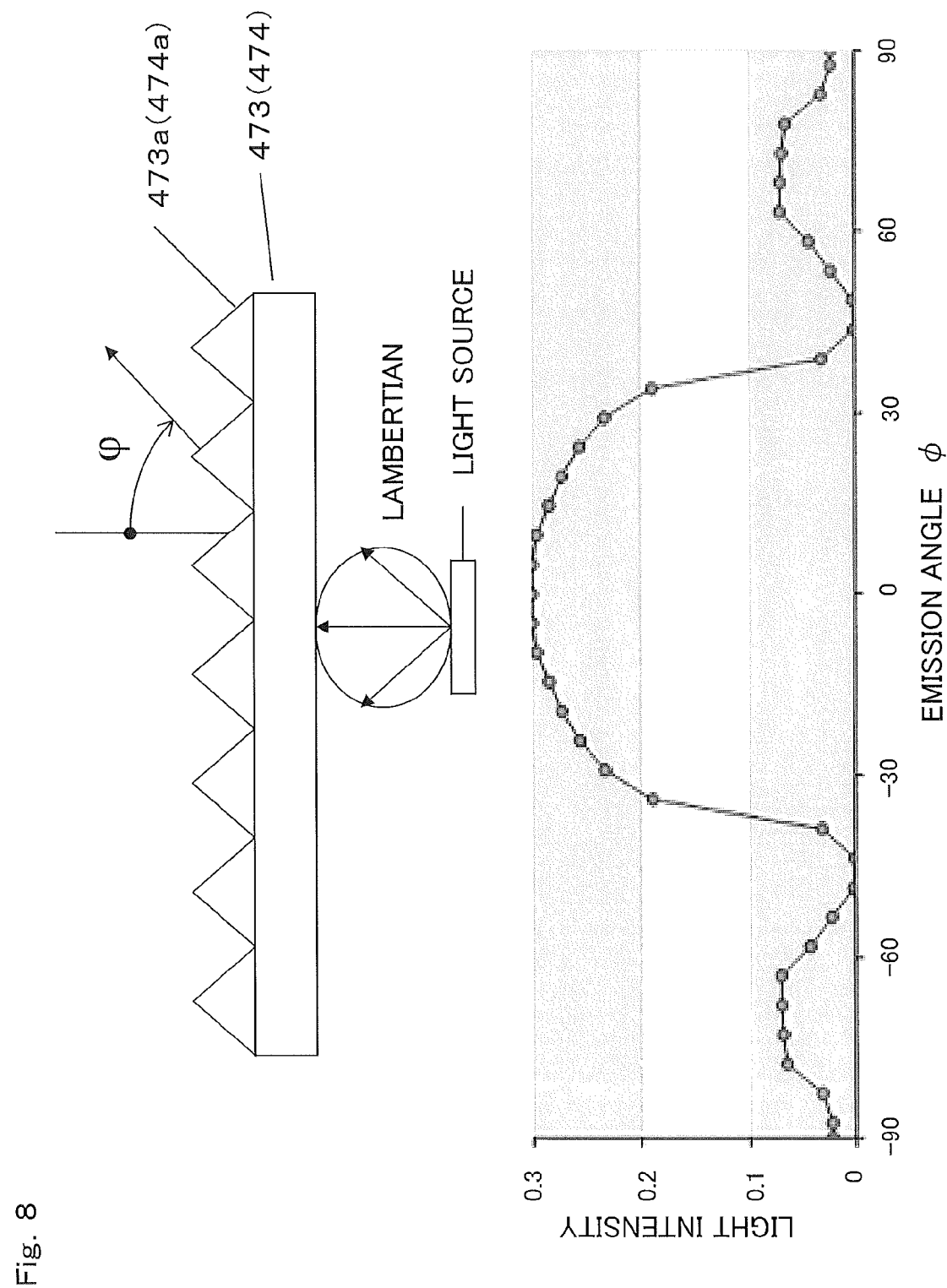
FIG. 8 is a diagram for explaining an optical characteristic of the prism sheet, showing the distribution of the intensity of light incident on a back surface of the prism sheet and emitted from the front surface of the prism sheet at an emission angle φ.

FIG. 8 is a diagram for explaining an optical characteristic of each of the prism sheets 473 and 474, showing the distribution of the intensity of light incident on the back surface thereof and emitted from the front surface thereof at an emission angle φ. It should be noted that FIG. 8 shows the optical characteristics in the case where a Lambertian light source is arranged at the back surface side of the prism sheet 473 or 474 as shown in FIG. 8.

As shown in FIG. 8, each of the horizontal convergence and vertical convergence prism sheets 473 and 474 causes light emitted from the front surface of the diffusion sheet 472 to have directivity and emits the light to the liquid crystal panel section 50 side, thereby improving the brightness as the backlight unit 51.

Incidentally, as shown in FIG. 5, in the display control system 10 according to the present disclosure, the infrared light 124 that is emitted from the electronic pen 1, reflected on the diffuse reflection sheet 48, and then incident on the electronic pen 1 is received by the image reading section 121, and the position information pattern 3 is read therefrom. Then, position information (coordinate information) is detected from the arrangement pattern of each mark 31 in the position information pattern 3. Therefore, if the amount of the infrared light 124 reflected on the diffuse reflection sheet 48 and incident on the electronic pen 1 is small, the contrast of an image of the position information pattern 3 read by the image reading section 121 is decreased, and thus it is made impossible to accurately detect a position coordinate from the image by the processing circuit section 13.

Here, the case where, unlike the present embodiment, the angle distribution conversion sheet 475 is not provided will be described.

First, in the case where the electronic pen 1 is used such that the electronic pen 1 stands perpendicularly to the display surface 2a of the display device 2, the infrared light 113 emitted from the electronic pen 1 is incident on the sheet surface of each of the prism sheets 473 and 474 at an incident angle of 0°. Thus, as shown in FIG. 7, the infrared light 113 passes through each of the prism sheets 473 and 474 at a high transmittance and is reflected on the diffuse reflection sheet 48. Then, the infrared light 124 reflected on the diffuse reflection sheet 48 passes through each of the prism sheets 473 and 474 from the back surface side and is incident on the electronic pen 1. Therefore, the amount of the infrared light 124 incident on the electronic pen 1 is not decreased due to each of the prism sheets 473 and 474, an image of the position information pattern 3 with high contrast is allowed to be obtained by the image reading section 121, and a position coordinate is allowed to be accurately detected by the processing circuit section 13.

Subsequently, in the case where the electronic pen 1 is used in a state where the electronic pen 1 is tilted, for example, at an angle of 45° with respect to the display surface 2a of the display device 2 (hereinafter, referred to as "the case of a pen-tilted state"), the infrared light 113 emitted from the electronic pen 1 is incident on the sheet surface of each of the prism sheets 473 and 474 at an incident angle of about 45°. Thus, as shown in FIG. 7, most of the infrared light 113 cannot pass through the prism sheets 473 and 474, and the amount of the infrared light 124 incident on the electronic pen 1 is greatly decreased. Therefore, the contrast of an image of the position information pattern 3 is greatly decreased, and it is made difficult to accurately detect a position coordinate.

Figure 9:
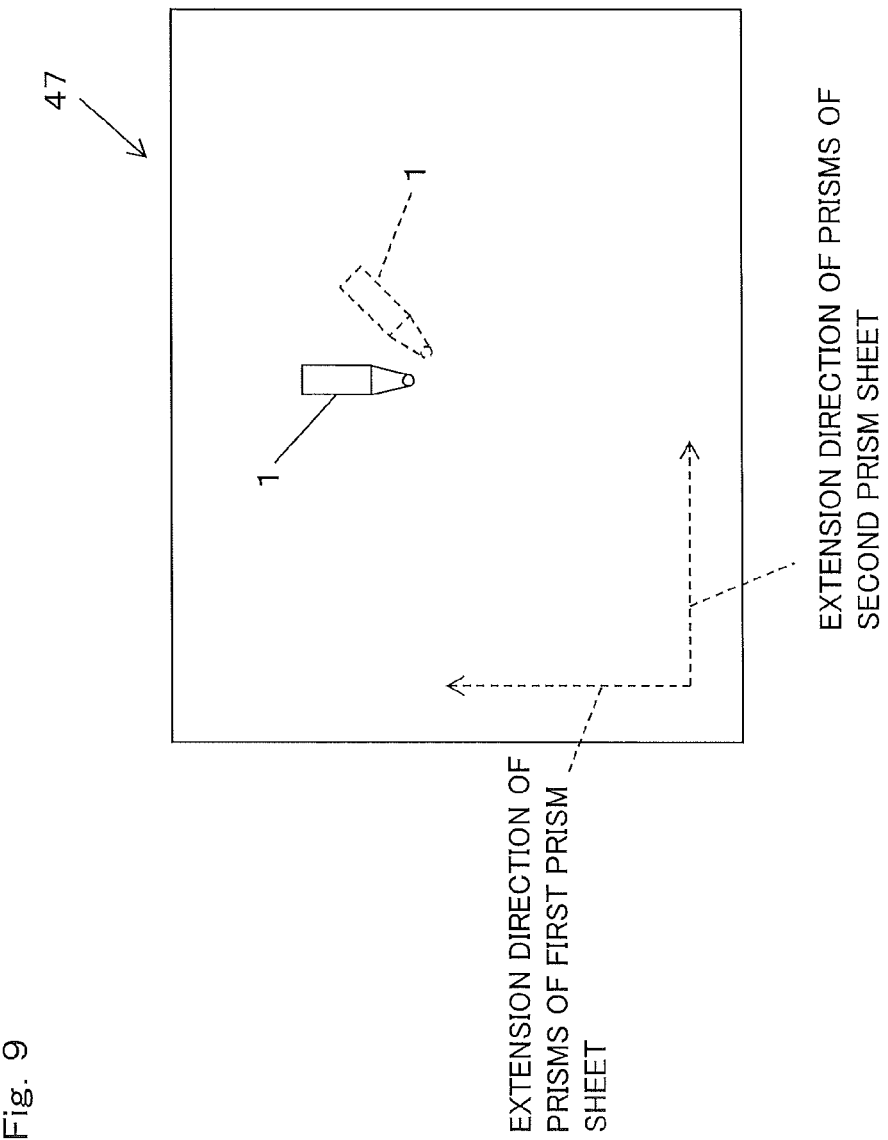
FIG. 9 is a front view of the surface light source section, for explaining the orientation of the electronic pen with respect to directions in which prisms extend.

Specifically, in a first case where, in the case of the pen-tilted state, when the surface light source section 47 is seen from its front, the direction of the infrared light 113 emitted by the electronic pen 1 is perpendicular to the extension direction of the prisms 474a of the one prism sheet 474 (in the case where the orientation of the electronic pen 1 is as shown by a solid line in FIG. 9), the infrared light 113 passes through the one prism sheet 474 at the transmittance shown in FIG. 7. On the other hand, the infrared light 113 passes through the other prism sheet 473 at the same transmittance as that when passing through a sheet having a flat front surface and a flat back surface. In other words, the transmittance of the infrared light is decreased at only the one prism sheet 474. In the first case, depending on the amount of emitted light as the infrared light 113, it is possible to detect a position coordinate, but it is made difficult to detect a position coordinate.

In addition, in a second case where, in the case of the pen-tilted state, when the surface light source section 47 is seen from its front, the direction of the infrared light 113 emitted by the electronic pen 1 forms an angle of 45° with respect to both of the extension directions of the prisms 473a and 474a of the prism sheets 473 and 474 (in the case where the orientation of the electronic pen 1 is as shown by a broken line in FIG. 9), the transmittance of the infrared light 113 is decreased at both of the prism sheets 473 and 474. Thus, the amount of the infrared light 124 incident on the electronic pen 1 is smaller than that in the first case. In the second case, almost no infrared light 124 is incident on the electronic pen 1. Thus, the contrast of an image of the position information pattern 3 is very low, and it is made very difficult to detect a position coordinate.

Therefore, in the display control system 10 according to the present disclosure, the angle distribution conversion sheet 475, which changes the angle distribution of light incident on the front surface thereof to another angle distribution and emits the light from the back surface thereof at the second prism sheet 474 side, is provided at the front side of the second prism sheet 474.

[5. Regarding Angle Distribution Conversion Sheet]

Figure 10:
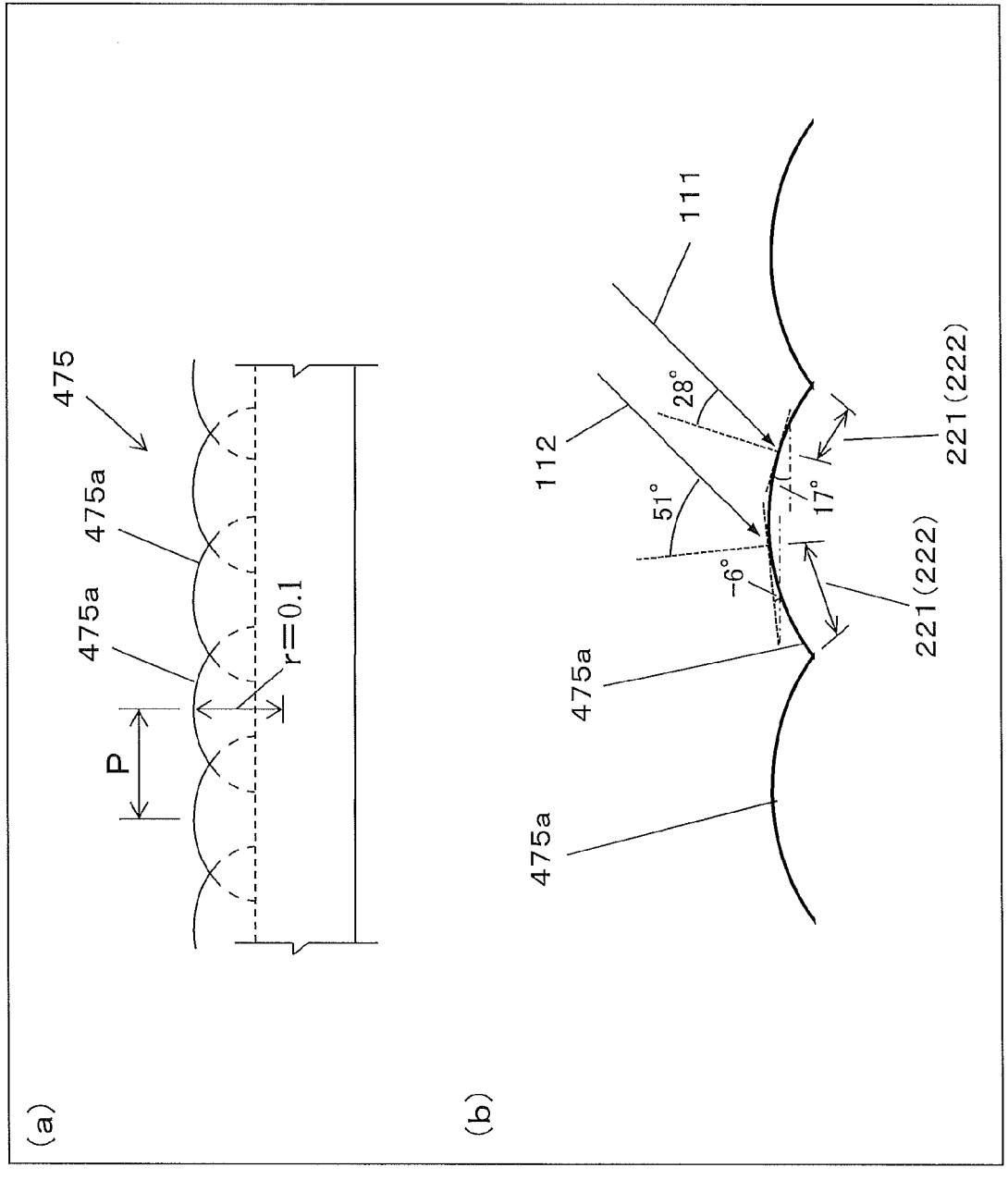
FIG. 10 is a diagram showing a cross-sectional shape of an angle distribution conversion sheet.

FIG. 10 is a diagram showing a cross-sectional shape of the angle distribution conversion sheet 475. In FIG. 10, (a) is a diagram showing a cross-sectional shape of a row including a plurality of projections 475a, and (b) is an enlarged view of surfaces of the projections 475a. In FIG. 10, (a) and (b) are diagrams each showing a cross-sectional shape at the position of the center of the circular projection 475a in a front view.

As shown in FIG. 6, the angle distribution conversion sheet 475 is a rectangular sheet having a plurality of projections 475a (lens portions) formed on a front surface thereof. The plurality of projections 475a are arranged in a matrix manner. For example, on the front surface of the angle distribution conversion sheet 475, the plurality of projections 475a are arranged in each of two arrangement directions perpendicular to each other (the longitudinal direction and the lateral direction of the angle distribution conversion sheet 475). In each arrangement direction, as shown in (a) of FIG. 10, the outer peripheral sides of the adjacent projections 475a overlap each other. A portion of a convex surface exposed on each projection 475a is a front surface of a later-described conversion region 221 or 222. Each projection 475a is circular in a front view thereof. When the curvature radius of each projection 475a is defined as r and the pitch between each lens portion 475a is defined as P, the plurality of projections 475a are arranged in each arrangement direction so as to meet a relational expression of $1.5 \leq P/r \leq 3.0$. It should be noted that the angle distribution conversion sheet 475 may be a sheet having a plurality of projections (lens portions) formed on a back surface thereof, or may be a sheet having a plurality of recesses (lens portions) formed on a front surface or a back surface thereof. In addition, due to errors in manufacturing, not all of the projections 475a necessarily have the same shape. When errors are included in the shapes of the projections 475a, the curvature radius r means the average curvature radius of the plurality of projections 475a.

When the pitch P is excessively large, a flat surface is formed between the adjacent projections 475a, and the later-described conversion region 221 or 222 is reduced in size. Even when the pitch P is excessively small, the ratio of a region where a tilt with respect to the sheet surface is small is increased, and the later-described conversion region 221 or 222 is reduced in size. The plurality of projections 475a may be arranged in each arrangement direction so as to meet a relational expression of $1.5 \leq P/r \leq 2.5$, or may be arranged in each arrangement direction so as to meet a relational expression of $1.5 \leq P/r \leq 2.0$. It should be noted that in the present embodiment, the plurality of projections 475a are arranged in a lattice arrangement, but the angle distribution conversion sheet 475 is not limited thereto. For example, between the adjacent rows of the projections 475a, the position of each projection 475a may be shifted by half of the pitch P in the arrangement direction of the projections 475a.

The angle distribution conversion sheet 475 has the first conversion region 221 that causes light incident on the front surface thereof at the determined angle $\theta a$ ($\theta a = 45°$ in the case of FIG. 7) as an incident angle with respect to the sheet surface of the angle distribution conversion sheet 475 to be emitted from the back surface thereof at an angle of not larger than 40° or not smaller than 60° as an emission angle with respect to the sheet surface of the angle distribution conversion sheet 475, in a cross-sectional view in a first direction perpendicular to the extension direction of the prisms 473a of the first prism sheet 473. In the case where light for reading the position information pattern 3 (light having a beam diameter that allows the position information pattern 3 to be read) is applied to the front surface of the angle distribution conversion sheet 475 at the determined angle $\theta a$ as an incident angle with respect to the sheet surface of the angle distribution conversion sheet 475 and in the first direction in a front view of the angle distribution conversion sheet 475, 20% or more of the light passes through the first conversion region 221. In other words, when the front surface of the angle distribution conversion sheet 475 is seen in the direction of the light having the determined angle $\theta a$ in the cross-sectional view in the first direction (when the front surface of the angle distribution conversion sheet 475 is projected on a plane perpendicular to the direction of the light having the determined angle $\theta a$), the first conversion region 221 accounts for 20% or more of the front surface. The first conversion region 221 is shown in (b) of FIG. 10. The first conversion region 221 will be described in detail later. It should be noted that the ratio of the light passing through the first conversion region 221 may be not lower than 25%.

The light emitted from the back surface of the angle distribution conversion sheet 475 is incident on the front surface of the second prism sheet 474 and is emitted from the back surface thereof. Here, in the second prism sheet 474, the prisms 474a extend in the first direction. Thus, in the cross-sectional view in the first direction, at the second prism sheet 474, an incident angle of light with respect to the front surface is equal to an emission angle of light with respect to the back surface. In the cross section in the first direction, light emitted from the back surface of the angle distribution conversion sheet 475 at an emission angle of not larger than 40° or not smaller than 60° with respect to the sheet surface thereof is incident on the first prism sheet 473 at an incident angle of not larger than 40° or not smaller than 60° with respect to the sheet surface of the first prism sheet 473, without the angle thereof being converted by the second prism sheet 474. Therefore, as shown in FIG. 7, as compared to the case where the angle distribution conversion sheet 475 is not present (i.e., in the case where light is incident on the first prism sheet 473 at the determined angle θa), the transmittance of the first prism sheet 473 is increased, and the amount of light incident on the electronic pen 1 is increased.

The angle distribution conversion sheet 475 has the second conversion region 222 that causes light incident on the front surface thereof at the determined angle θa (θa=45° in the case of FIG. 7) as an incident angle with respect to the sheet surface of the angle distribution conversion sheet 475 to be emitted from the back surface thereof at an angle of not larger than 40° or not smaller than 60° as an emission angle with respect to the sheet surface of the angle distribution conversion sheet 475, in a cross-sectional view in a second direction perpendicular to the extension direction of the prisms 474a of the second prism sheet 474. In the case where light for reading the position information pattern 3 is applied to the front surface of the angle distribution conversion sheet 475 at the determined angle θa as an incident angle with respect to the sheet surface of the angle distribution conversion sheet 475 in the second direction in the front view of the angle distribution conversion sheet 475, 20% or more of the light passes through the second conversion region 222. The second conversion region 222 is shown in (b) of FIG. 10. When the angle distribution conversion sheet 475 is seen from its front, the first conversion region 221 and the second conversion region 222 partially overlap each other. It should be noted that the ratio of the light passing through the second conversion region 222 may be not lower than 25%.

The light emitted from the back surface of the angle distribution conversion sheet 475 is incident on the front surface of the second prism sheet 474. In the cross section in the second direction, light emitted from the back surface of the angle distribution conversion sheet 475 at an emission angle of not larger than 40° or not smaller than 60° with respect to the sheet surface thereof is incident on the second prism sheet 474 at an incident angle of not larger than 40° or not smaller than 60° with respect to the sheet surface of the second prism sheet 474. Therefore, as shown in FIG. 7, as compared to the case where the angle distribution conversion sheet 475 is not present, the transmittance of the second prism sheet 474 is increased, and the amount of light incident on the electronic pen 1 is increased.

FIG. 11 is a diagram for explaining angle conversion of light incident on the front surface of the angle distribution conversion sheet 475 at an incident angle of 45° with respect to the sheet surface. In FIG. 11, (a) is a diagram for explaining the vertical axis and the horizontal axis of a graph in (b) of FIG. 11. In FIG. 11, (b) shows, for the light incident on the front surface of the angle distribution conversion sheet 475 at an incident angle 45° with respect to the sheet surface of the angle distribution conversion sheet 475, a relationship between a tilt angle α of the front surface with respect to the sheet surface and an emission angle β of the light from the back surface.

As shown in (b) of FIG. 11, at the angle distribution conversion sheet 475, when light is incident at an incident angle of 45° on a region where the tilt angle α of the front surface with respect to the sheet surface is not larger than −6°, the light whose angle has been converted is emitted from the back surface at an emission angle β of not larger than 40°. In addition, when light is incident at an incident angle of 45° on a region where the tilt angle α of the front surface with respect to the sheet surface is not smaller than 17°, the light whose angle has been converted is emitted from the back surface at an emission angle β of not smaller than 60°. In FIG. 11, in a situation where light is incident from upper right at an incident angle of 45°, the tilt angle α is increased when the tilt of the front surface of the angle distribution conversion sheet 475 with respect to the sheet surface thereof is increased in the clockwise direction.

In FIG. 10, (b) shows, in the cross-sectional view in the first direction (or the second direction), a situation where a first light beam 111 incident from upper right at an incident angle 45° with respect to the sheet surface is incident at a position where the tilt angle is 17° and a situation where a second light beam 112 incident from upper right at an incident angle 45° with respect to the sheet surface is incident at a position where the tilt angle is −6°. In (b) of FIG. 10, in each projection 475a, a region where the tilt angle is not smaller than 17° and a region where the tilt angle is not larger than −6° is the first conversion region 221. The first light beam 111 is incident at an incident angle 28° on the surface of the projection 175a at the position where the tilt angle is 17°. The second light beam 112 is incident at an incident angle 51° on the surface of the projection 175a at the position where the tilt angle is −6°. The first conversion region 221 is a region where the front surface is tilted with respect to the sheet surface such that when light is applied to the front surface of the angle distribution conversion sheet 475 at the determined angle θa as an incident angle with respect to the sheet surface of the angle distribution conversion sheet 475, an incident angle with respect to the surface at the position at which the light is incident is not larger than 28° or not smaller than 51°, in the cross-sectional view in the first direction. In addition, the second conversion region 222 is a region where the front surface is tilted with respect to the sheet surface such that when light is applied to the front surface of the angle distribution conversion sheet 475 at the determined angle θa as an incident angle with respect to the sheet surface of the angle distribution conversion sheet 475, an incident angle with respect to the surface at the position at which the light is incident is not larger than 28° or not smaller than 51°, in the cross-sectional view in the second direction.

Due to the above, even when the electronic pen 1 is used in a state of being tilted at an angle of 45° with respect to the display surface 2a of the display device 2, the angle of the infrared light 113 emitted from the electronic pen 1 is converted by the angle distribution conversion sheet 475. Due to the angle conversion, the amount of the infrared light 113 incident on the sheet surface of the prism sheets 473 and 474 at an incident angle of not larger than 40° or not smaller than 60° is increased. Thus, the transmittance of the infrared light 113 at each of the prism sheets 473 and 474 is increased. Then, the infrared light 124 resulting from the diffusion and reflection on the diffuse reflection sheet 48 passes through the surface light source section 47 and the like from their back surfaces and is incident on the electronic pen 1. Due to this, the amount of the infrared light 124 incident on the electronic pen 1 is increased, an image of the position information pattern 3 with high contrast is allowed to be obtained by the image reading section 121, and a position coordinate is allowed to be accurately detected. Even in the second case described above (the case where the orientation of the electronic pen 1 is as shown by the broken line in FIG. 9), a position coordinate is allowed to be accurately detected.

Here, the angle distribution conversion sheet 475 may be a sheet that is able to convert a determined amount of light incident thereon from a front surface side thereof into a determined angle (i.e., an angle corresponding to an optical characteristic that the transmittance of light with respect to the incident angle at each of the prism sheets 473 and 474 is increased) and to emit the light. For example, a microlens sheet in which microlenses formed from spherical glass beads are arranged on a translucent resin sheet so as to be embedded thereon may be used as the angle distribution conversion sheet 475.

Table 1 shows a result of evaluation of two types of angle distribution conversion sheets 475 having different characteristics of angle distribution conversion. Table 1 shows a result of an experiment regarding whether or not a position coordinate can be read from the position information pattern 3 by the electronic pen 1 in the display control system 10 having the configuration in FIG. 5. The angle distribution conversion sheet 475 used in this experiment is a microlens sheet with microlenses having a curvature radius r=0.1 μm. In the angle distribution conversion sheet 475 of the example, when a pitch between each microlens is defined as P, P/r is 2.0. Meanwhile, an angle distribution conversion sheet of a comparative example is also a microlens sheet with microlenses having a curvature radius r=0.1 μm. In the angle distribution conversion sheet of the comparative example, P/r is 1.0. For each sample, a ratio of light emitted from the back surface of the sample at an emission angle other than 40° to 60° when light was caused to be incident at an incident angle of 45° on the front surface of the sample, was investigated. The result is shown in Table 1. In Table 1, "○" and "x" indicate whether or not reading of the position information pattern 3 was possible when light was caused to be incident on the front surface at an incident angle of 45°.

TABLE 1

| | P/r | Ratio at which light incident at incident angle of 45° is emitted at emission angle other than 40° to 60° | Pattern reading |
| --- | --- | --- | --- |
| Example | 2.0 | 25% | ○ |
| Comparative example | 1.0 | 10% | x |

As shown in Table 1, with the sample of the example, the ratio of light emitted at an angle other than 40° to 60° was 25%, and with the sample of the comparative example, the ratio of light emitted at an angle other than 40° to 60° was about 10%. With the sample of the example, reading of the position information pattern 3 was possible, but with the sample of the comparative example, reading of the position information pattern 3 was impossible.

Due to this result, it was confirmed that reading of the position information pattern 3 is possible when the angle distribution conversion sheet 475 having an optical characteristic that a ratio of light emitted at an emission angle other than 40° to 60° is not lower than 25% when light is caused to be incident at an incident angle of 45°.

[6. Advantageous Effects Etc.]

As described above, the display control system 10 according to the present embodiment includes, at the front surface side of the prism sheets 473 and 474, the angle distribution conversion sheet 475 that changes the angle distribution of light incident thereon to another angle and emits the light to the prism sheets 473 and 474 at the back surface side thereof. Even when the electronic pen 1 is used in a state of being tilted at an angle of 45° with respect to the display surface 2a of the display device 2, 20% or more of light passes through the first conversion region 221 in the cross-sectional view in the first direction, and 20% or more of light passes through the second conversion region 222 in the cross-sectional view in the second direction. At each of the conversion regions 221 and 222, the angle of the infrared light 113 emitted from the electronic pen 1 is converted such that the incident angle thereof on each of the prism sheets 473 and 474 becomes an angle other than 40° to 60°. As a result, the transmittance of each of the prism sheets 473 and 474 is increased. Therefore, an image of the position information pattern 3 with high contrast is allowed to be obtained by the image reading section 121 of the electronic pen 1, and a position coordinate is allowed to be accurately read by the processing circuit section 13.

In addition, the angle distribution conversion sheet 475 desirably has an optical characteristic that when light is caused to be incident thereon at an angle of 45°, a ratio of light emitted at an angle other than 40° to 60° is not lower than 25%.

It should be noted that in the present embodiment, the range of each of the conversion regions 221 and 222 may be determined on the basis of the transmittance of each of the prism sheets 473 and 474. For example, the first conversion region 221 may be a region that causes light incident on the front surface at the determined angle θa as an incident angle with respect to the sheet surface of the angle distribution conversion sheet 475 to be emitted from the back surface at an emission angle at which the transmittance of the first prism sheet 473 is not lower than 40%, in the cross-sectional view in the first direction. Similarly, the second conversion region 222 may be a region that causes light incident on the front surface at the determined angle θa as an incident angle with respect to the sheet surface of the angle distribution conversion sheet 475 to be emitted from the back surface at an emission angle at which the transmittance of the second prism sheet 474 is not lower than 40%, in the cross-sectional view in the second direction. In this case, when light for reading the position information pattern 3 is applied to the front surface of the angle distribution conversion sheet 475 at the determined angle θa as an incident angle with respect to the sheet surface of the angle distribution conversion sheet 475 and in the first direction (or the second direction) in the front view of the angle distribution conversion sheet 475, 20% or more of the light passes through the first conversion region 221 (or the second conversion region 222). It should be noted that the ratio of the light passing through the first conversion region 221 (or the second conversion region 222) may be not lower than 25%.

Other Embodiments

As described above, the embodiment has been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in the embodiment can be combined to provide a new embodiment.

Other embodiments will be described below.

In the embodiment, the lens portion of the angle distribution conversion sheet 475 may have a shape that is less likely to affect the visibility of an image, and may have another shape such as an elliptical shape in a front view.

In the embodiment, each position information pattern 3 represents a position coordinate on the display surface 2a, but the present disclosure is not limited thereto. Each position information pattern 3 suffices to represent information regarding a position on the display area, and each position information pattern 3 may represent information associated with a position coordinate on a control table.

In the embodiment, in the electronic pen 1, position information is identified from an image pattern obtained by reading the position information pattern 3, but the present disclosure is not limited thereto. For example, image data of an image pattern may be transmitted from the electronic pen 1 to the display device 2, and the display device 2 may identify position information on the basis of the received image data.

In the embodiment, the position information patterns 3 are provided on the front side with respect to the touch panel 49, but the position information patterns 3 may be provided on the back side with respect to the touch panel 49.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A display device comprising:
    a display panel having a display area on which an image is displayed;
    a backlight unit including a surface light source section arranged at a back surface side of the display panel and a diffuse reflection sheet arranged at a back surface side of the surface light source section; and
    a plurality of position information patterns arranged on the display area and each representing information regarding a position thereof on the display area, wherein
    the surface light source section includes:
        at least one prism sheet configured to cause light emitted from the surface light source section to have directivity; and
        an angle distribution conversion sheet arranged between the prism sheet and the display panel,
    a transmittance of light transmitted from a front surface of the prism sheet to a back surface of the prism sheet is lowest when an incident angle thereof with respect to a sheet surface of the prism sheet is a determined angle of larger than 40° and smaller than 60°,
    the angle distribution conversion sheet has a conversion region that causes light incident on a front surface thereof at the determined angle as an incident angle with respect to a sheet surface of the angle distribution conversion sheet to be emitted from a back surface thereof at an emission angle of not larger than 40° or not smaller than 60° with respect to the sheet surface, in a cross-sectional view in a first direction perpendicular to an extension direction of prisms of the prism sheet, and
    when light for reading the position information pattern is applied to the front surface of the angle distribution conversion sheet at the determined angle as an incident angle with respect to the sheet surface of the angle distribution conversion sheet and in the first direction in a front view of the angle distribution conversion sheet, 20% or more of the light passes through the conversion region.

2. The display device according to claim 1, wherein
    the at least one prism sheet is a first prism sheet and the conversion region is a first conversion region,
    the surface light source section includes a second prism sheet whose extension direction of prisms intersects the extension direction of the prisms of the first prism sheet,
    the angle distribution conversion sheet has a second conversion region that causes light incident on the front surface thereof at the determined angle as an incident angle with respect to the sheet surface of the angle distribution conversion sheet to be emitted from the back surface thereof at an emission angle of not larger than 40° or not smaller than 60° with respect to the sheet surface, in a cross-sectional view in a second direction perpendicular to the extension direction of the prisms of the second prism sheet, and
    when light for reading the position information pattern is applied to the front surface of the angle distribution conversion sheet at the determined angle as an incident angle with respect to the sheet surface of the angle distribution conversion sheet and in the second direction in the front view of the angle distribution conversion sheet, 20% or more of the light passes through the second conversion region.

3. The display device according to claim 1, wherein the conversion region is a region where the front surface is tilted with respect to the sheet surface of the angle distribution conversion sheet such that, in the cross-sectional view in the first direction, when light is applied to the front surface of the angle distribution conversion sheet at the determined angle as an incident angle with respect to the sheet surface, an incident angle with respect to a surface at a position at which the light is incident is not larger than 28° or not smaller than 51°.

4. The display device according to claim 1, wherein when light for reading the position information pattern is applied to the front surface of the angle distribution conversion sheet at the determined angle as an incident angle with respect to the sheet surface of the angle distribution conversion sheet in the first direction in the front view of the angle distribution conversion sheet, 25% or more of the light passes through the conversion region.

5. A display control system comprising:
    the display device according to claim 1; and
    a position pointing device including an irradiation section configured to emit infrared light and an image reading section configured to receive the infrared light reflected on the diffuse reflection sheet, wherein the image reading section receives the infrared light that is emitted from the irradiation section, then reflected on the diffuse reflection sheet, and incident on the position pointing device, and reads an image of the position information pattern, thereby detecting position information of the position information pattern.

6. A display device comprising:

a display panel having a display area on which an image is displayed;

a backlight unit including a surface light source section arranged at a back surface side of the display panel and a diffuse reflection sheet arranged at a back surface side of the surface light source section; and a plurality of position information patterns arranged on the display area and each representing information regarding a position thereof on the display area, wherein the surface light source section includes:
 at least one prism sheet configured to cause light emitted from the surface light source section to have directivity; and
 an angle distribution conversion sheet arranged between the prism sheet and the display panel, a transmittance of light transmitted from a front surface of the prism sheet to a back surface of the prism sheet is lowest when an incident angle thereof with respect to a sheet surface of the prism sheet is a determined angle, the angle distribution conversion sheet has a conversion region that causes light incident on a front surface thereof at the determined angle as an incident angle with respect to a sheet surface of the angle distribution conversion sheet to be emitted from a back surface thereof at an emission angle which allows a transmittance of the prism sheet for the light to be not smaller than 40°, in a cross-sectional view in a first direction perpendicular to an extension direction of a prism of the prism sheet, and when light for reading the position information pattern is applied to the front surface of the angle distribution conversion sheet at the determined angle as an incident angle with respect to the sheet surface of the angle distribution conversion sheet in the first direction in a front view of the angle distribution conversion sheet, 20% or more of the light passes through the conversion region.

7. A display control system comprising:

the display device according to claim 6; and a position pointing device including an irradiation section configured to emit infrared light and an image reading section configured to receive the infrared light reflected on the diffuse reflection sheet, wherein the image reading section receives the infrared light that is emitted from the irradiation section, then reflected on the diffuse reflection sheet, and incident on the position pointing device, and reads an image of the position information pattern, thereby detecting position information of the position information pattern.

8. A display device comprising:

a display panel having a display area on which an image is displayed;

a backlight unit including a surface light source section arranged at a back surface side of the display panel and a diffuse reflection sheet arranged at a back surface side of the surface light source section; and a plurality of position information patterns arranged on the display area and each representing information regarding a position on the display area, wherein the surface light source section includes:
 at least one prism sheet configured to cause light emitted from the surface light source section to have directivity; and
 an angle distribution conversion sheet arranged between the prism sheet and the display panel, a plurality of projections or a plurality of recesses are formed as lens portions on a front surface or a back surface of the angle distribution conversion sheet so as to be arranged in a matrix manner, and when a curvature radius of each lens portion is defined as r and a pitch between each lens portion in a direction in which the plurality of lens portions are arranged is defined as P, the plurality of lens portions are arranged so as to meet a relational expression of $1.5 \leq P/r \leq 3.0$.

9. A display control system comprising:

the display device according to claim 8; and a position pointing device including an irradiation section configured to emit infrared light and an image reading section configured to receive the infrared light reflected on the diffuse reflection sheet, wherein the image reading section receives the infrared light that is emitted from the irradiation section, then reflected on the diffuse reflection sheet, and incident on the position pointing device, and reads an image of the position information pattern, thereby detecting position information of the position information pattern.

\* \* \* \* \*